(12) United States Patent
Rijkom et al.

(10) Patent No.: US 9,049,472 B2
(45) Date of Patent: Jun. 2, 2015

(54) SYSTEMS AND METHODS FOR DYNAMIC MEDIA PLAYERS UTILIZING MEDIA TRAITS

(75) Inventors: Edwin Van Rijkom, Utrecht (NL); Brian Riggs, Berkeley, CA (US); Vijay Ghaskadvi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1256 days.

(21) Appl. No.: 12/548,782

(22) Filed: Aug. 27, 2009

(65) Prior Publication Data

US 2013/0158690 A1    Jun. 20, 2013

(51) Int. Cl.
| G06F 17/00 | (2006.01) |
| H04N 21/432 | (2011.01) |
| G06F 3/048 | (2013.01) |
| H04N 21/45 | (2011.01) |
| H04N 21/462 | (2011.01) |
| H04N 21/84 | (2011.01) |

(52) U.S. Cl.
CPC ............ *H04N 21/4325* (2013.01); *G06F 3/048* (2013.01); *H04N 21/4516* (2013.01); *H04N 21/462* (2013.01); *H04N 21/84* (2013.01)

(58) Field of Classification Search
CPC ....................................................... G06F 3/048
USPC .................................... 700/94; 715/716, 744
See application file for complete search history.

(56) References Cited

U.S. PATENT DOCUMENTS

| 7,529,370 | B1 | 5/2009 | Zhang et al. | |
| 7,660,416 | B1 | 2/2010 | Kline | |
| 7,869,068 | B2 | 1/2011 | Foehr et al. | |
| 7,934,159 | B1* | 4/2011 | Rahman et al. | 715/716 |
| 2002/0105534 | A1* | 8/2002 | Balassanian | 345/716 |
| 2002/0191950 | A1 | 12/2002 | Wang | |
| 2002/0196912 | A1 | 12/2002 | Norris | |
| 2005/0010901 | A1 | 1/2005 | Udler | |
| 2006/0236234 | A1 | 10/2006 | Michelstein et al. | |
| 2008/0193109 | A1 | 8/2008 | Kakumu et al. | |
| 2008/0212937 | A1 | 9/2008 | Son | |
| 2008/0288866 | A1* | 11/2008 | Spencer et al. | 715/716 |
| 2009/0113301 | A1 | 4/2009 | Fisher et al. | |
| 2010/0058220 | A1 | 3/2010 | Carpenter | |
| 2010/0241963 | A1 | 9/2010 | Kulis et al. | |

(Continued)

OTHER PUBLICATIONS

W3C Consortium, Synchronized Multimedia Integration Language (SMIL) 1.0 Specification, Jun. 15, 1998, available at http://www.w3.org/TR/REC-smil (last accessed Jun. 12, 2009).

(Continued)

*Primary Examiner* — Joseph Saunders, Jr.
(74) *Attorney, Agent, or Firm* — Kilpatrick Townsend & Stockton LLP

(57) ABSTRACT

A media player can identify one or more elements of a media presentation and select an element of the media presentation for generating output. The elements may be identified in a playlist or elsewhere. For example, the playlist may specify a composition of a plurality of visual, audio, or other elements for generating output or other behavior in parallel and/or in series over the course of the media presentation. The media player can comprise a playback component configured to utilize at least one selectively-enabled functional component of the media player to generate output based on evaluating the trait(s) exposed by the selected element. Traits may be determined based on analyzing media types or other data regarding the elements of the presentation.

35 Claims, 4 Drawing Sheets

(56) References Cited

U.S. PATENT DOCUMENTS

| | | |
|---|---|---|
| 2010/0281545 A1 | 11/2010 | Levy |
| 2010/0332565 A1 | 12/2010 | Al-Shaykh et al. |
| 2010/0332993 A1 | 12/2010 | Bousseton et al. |
| 2011/0072374 A1 | 3/2011 | Kunz et al. |
| 2011/0202842 A1 | 8/2011 | Weatherly et al. |

OTHER PUBLICATIONS

W3C Consortium, Synchronized Multimedia Integration Language (SMIL) 2.1 Specification, Jun. 15, 1998, available at http://www.w3.org/TR/2005/REC-SMIL2-20051213/smil21.html (last accessed Jun. 12, 2009).

W3C Consortium, Synchronized Multimedia Integration Language (SMIL 3.0), Dec. 1, 2008, available at http://www.w3.org/TR/SMIL/ (last accessed Jun. 12, 2009).

U.S. Appl. No. 12/548,728, filed Aug. 27, 2009 and entitled "Systems and Methods for Programmatically Interacting with a Media Player".

United States Patent and Trademark Office, Office Action, U.S. Appl. No. 12/548,728, dated Mar. 26, 2012.

United States Patent and Trademark Office, Office Action, U.S. Appl. No. 12/548,728, dated Oct. 5, 2012.

\* cited by examiner

SYSTEMS AND METHODS FOR DYNAMIC MEDIA PLAYERS UTILIZING MEDIA TRAITS

CROSS REFERENCE TO RELATED APPLICATIONS

This application is related to U.S. patent application Ser. No. 12/548,728, entitled "Systems and Methods for Programmatically Interacting with a Media Player", which is filed the same day as the present application and is incorporated by reference herein in its entirety.

TECHNICAL FIELD

The present subject matter generally pertains to distribution of content, particularly to the configuration and use of media players.

BACKGROUND

Effective development and deployment of media players remains an ongoing challenge for content providers. For example, many proposals have been offered for monetizing web-based video distribution by subscription fees, advertisements, and/or other methods. However, development costs can affect the success of a web-based video or other content distribution service. For example, a specialized video or other media player may need to be developed for different applications (e.g., a video player, an audio player, etc.). A media player can be constructed as a using rich internet applications such as the Flash® Player by Adobe Systems Incorporated of San Jose, Calif. However, construction of the media player can entail customization to support features of the distribution service, such as adding specialized playback controls and coding a video player to switch between content and advertisements. These customizations can represent a significant expense in time and funds.

SUMMARY

Embodiments of the present subject matter can provide a media player that selectively enables media player behavior based on one or more traits exposed by components of a media presentation.

For example, a computing system can be configured to provide a media player that selects an element of the media presentation for generating output. For example, the element may comprise a single file, or the media player may comprise a playlist parsing module configured to parse a playlist. The playlist may specify a composition of a plurality of visual, audio, or other elements for generating output or other behavior in parallel and/or in series over the course of the media presentation.

The media player can comprise a playback component configured to utilize at least one selectively-enabled functional component of the media player to generate output based on evaluating the trait(s) exposed by the selected element. Exposed traits can be determined by analyzing the type of media included in the selected element. For example, some elements may expose a "visible" trait and a "temporal" trait and, in response, the media player can selectively enable or disable aspects of a video playback component for output of those elements while disabling aspects of the video playback component when those traits are not present. As another example, other elements may be "visible" but may not expose the "temporal" trait, and so the media player can enable suitable components for rendering non-video content; other elements (e.g., audio) may be "temporal" but not "visible."

Embodiments include a method comprising accessing data defining a plurality of elements of a media presentation, selecting at least one element of the media presentation for use in generating behavior of a media player, determining a trait applicable to the identified element, and based on the identified trait, identifying a functional component of the media player to generate media player behavior using the selected element. The functional component can be identified using data indicating which functional component(s) correspond to one or more particular traits.

Embodiments also include computing systems and computer-readable media embodying program code for providing a media player with functionality that can vary based on exposed traits. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
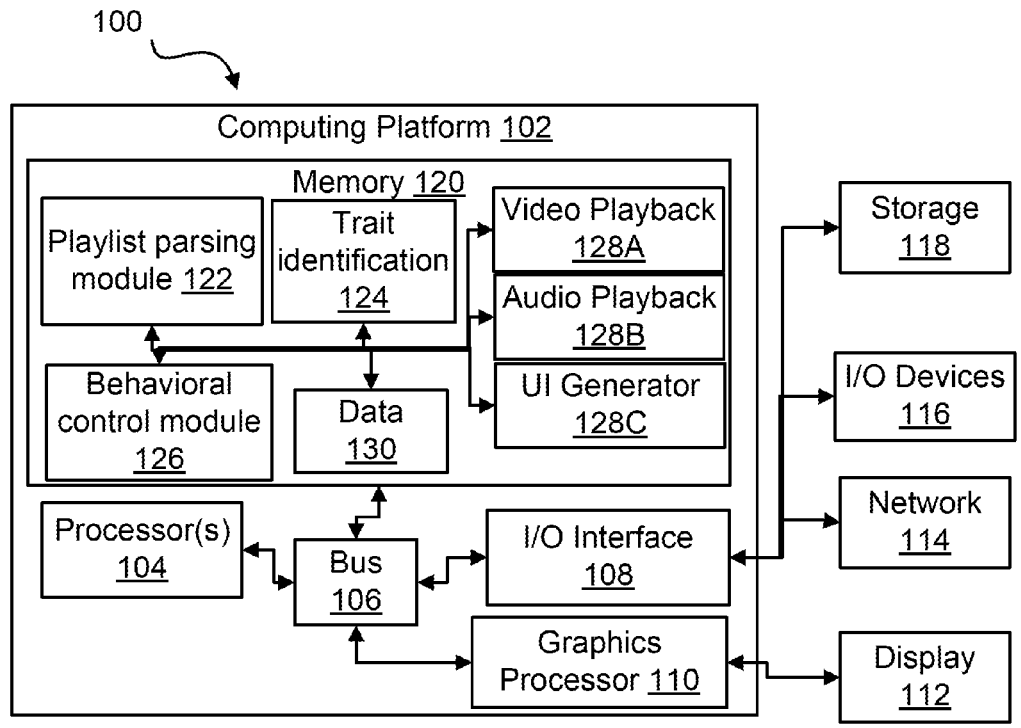
FIG. 1 is a block diagram illustrating an example of a computing system configured by program components to provide a media player with functionality selectively enabled based on traits exposed by elements of a media presentation

FIG. 1 is a block diagram illustrating an example of a computing system 100 configured by program components to provide a media player with functionality selectively enabled based on traits exposed by elements of a media presentation. In this example, computing system 100 includes a computing device 102 comprising one or more processors 104, a bus 106, memory 120, input-output (I/O) handling components 108, graphics processor/interface 110, a display 112, user input (UI) devices 116 (e.g., a mouse, keyboard, touch screen interface, etc.), one or more networking or other interfaces 116 (e.g., Ethernet, USB, etc.), and storage 118 (e.g., hard disk, optical drive(s)). Memory 120 represents one or more computer-readable media accessible by processor(s) 104.

Memory 120 embodies several program components that configure computing system 100 to function. Other components not illustrated here, such as an operating system, runtime environment, and other applications, may be embodied in memory as well. Computing device 100 can represent any device with media playback functionality, including, but not limited to, a personal computer, portable computer, tablet computer, cellular telephone/PDA/media player, or a home entertainment component (e.g., set-top box, video gaming device, DVD/DVR, television, etc.). The media player may comprise a stand-alone application, a plug-in for another application, or may be representative of functionality of an application (e.g., a web browser) with built-in media playback functionality.

Memory 120 includes a playlist parsing module 122 configured to parse a playlist that identifies a plurality of elements of a media presentation. Additionally, memory 120 includes a group of modules 124 and 126 collectively acting as a playback component. The playback component is configured to utilize at least one functional component 128 of the media player to generate output using the selected element(s) based on evaluating the trait exposed by the selected element(s) based on analysis of the media type of the selected element(s). For example, the media data may be analyzed and compared to known patterns or an indicator of the media type may be included in the name or metadata for a file corresponding to the selected element.

Data 130 is included to represent working data used by the media player, one or more playlists, and the data defining elements of the media presentation; this and other data may be maintained locally and/or remotely in various embodiments. For example, a client-side media player may download a playlist or composition data and then access content data and other elements from a remote server. As another example, the playlist and content data may be stored in locally-available media (e.g., a DVD or downloaded file).

In this example, module 124 comprises a trait identification module configured to identify a trait applicable to the selected element, while behavioral control module 126 is configured to direct one or more of functional components 128A, 128B, 128C, of the media player to generate output. For example, behavioral control module 126 may access data indicating which functional component(s) 128 correspond to the particular traits exposed by the selected element. As an example, video playback component 128A may be used when the element has the "visible" and "temporal" traits; audio playback component 128B may correspond to "audible" and "temporal" traits; and UI generation component 128C may correspond to "playable" traits.

When used, video playback component 128A can access data specified by the selected element and use the data to generate video output. For instance, one or more video codecs can be used as is known in the art. Similarly, audio playback component 128B can access data specified by the selected element and use the data to provide audio output. UI generation component 128C can access data specified by the selected element, if needed, in order to provide controls for the media player by rendering interface elements (e.g., buttons, sliders) linked to function calls to control the player.

For example, the selected element may expose the "seekable" trait which triggers the media player to provide standard seeking controls (e.g., play, rewind, fast-forward, scrub bar that is draggable, etc.). Object code for providing the UI elements may be included in the media player (i.e., as part of UI component 128C) and/or may be referenced by or included in the selected element. For example, the selected element may specify certain UI features and also include a "visible" trait for applying a skin referenced in the element data to change the appearance of the media player.

Any number or designation of traits can be specified for use in embodiments of the present subject matter and can be correlated to any number or type of functional components for the media player. In some embodiments, traits are specified positively—i.e. positively describing media player behavior (e.g., an element is only "playable" if it has the "playable" trait). In alternative embodiments, negative traits nomenclature could be used (e.g., all elements could be considered "seekable" except for those exposing the "not seekable" trait).

In some embodiments, at least the following traits are supported:

| Trait | Use |
|---|---|
| audible | determining whether to utilize audio capabilities |
| bitrate switchable | determining whether to change bitrate to better take advantage of available bandwidth |
| bufferable | determining whether to enable buffer capability |
| data transferable | determining what portion of the media has been/can be downloaded to a client |
| loadable | for use in initializing media before playback/presentation |
| pausible | for enabling pause UI element |
| playable | for enabling playback of media content and/or execution of non-media elements |
| seekable | for enabling seek controls |
| spatial | to indicate that the media has native/intrinsic dimensions |
| temporal | to indicate that the media has a duration |
| viewable | to indicate that the media has a visible element |

For instance, a number of traits can be mapped to use of certain functional components in consuming content data as noted below:

| Functional Component | Trait(s) | Content Data Used |
|---|---|---|
| video player, no controls | temporal AND viewable AND spatial | video data |
| video player with all controls | temporal AND viewable AND | video data |

-continued

| Functional Component | Trait(s) | Content Data Used |
|---|---|---|
| | playable AND pausible AND seekable | |
| audio player | temporal AND audible AND pausible AND seekable | audio data |
| graphic output or overlay | viewable AND spatial | raster/vector/other graphic |
| control overlay for sharing via social network | viewable AND spatial | (built in) or code referenced in playlist |
| viewing beacon | playable | (built in) or referenced in playlist |

The examples of traits and mapping of trait combinations to functional components are provided for purposes of explanation only. In practice, other trait names and mappings to functional components can be used. For example, functional components included in a media presentation may expose a "functional" trait or some other trait that indicates use of a non-media element or, like the viewing beacon noted above, the functional element may simply be "playable."

As an example of handling a non-media element, the behavioral control module may direct a data handling component of the media player to access a resource separate from the media player and to perform at least one of receiving data in machine form from the resource or providing data in machine form to the resource. Accessing the resource may, for instance, comprise sending the tracking or viewing beacon to a server specified in the media element declaring the viewing beacon. As another example, accessing the resource can comprise loading a plugin to dynamically extend the functionality of the media player, such as by providing additional UI elements (e.g., for recommending a video to a social network contact) or providing a parser that enables the media player to recognize elements specified in a particular composition language. Dynamically extending the media player functionality may allow for new features to be added while a presentation is ongoing without the need to restart the player.

In some embodiments, the available traits and the mapping of media presentation elements to traits are extensible, and so the listing of traits in the examples herein should not be viewed as limiting.

Figure 2:
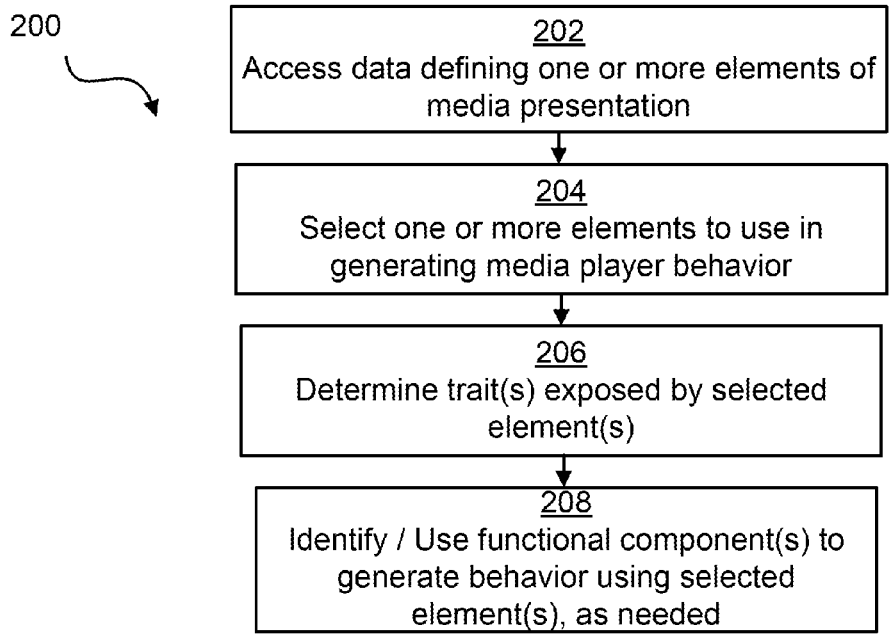
FIG. 2 is a flowchart illustrating steps in an exemplary method for providing a media player with functionality based on exposed traits

FIG. 2 is a flowchart illustrating steps in an exemplary method 200 for providing a media player with functionality based on exposed traits. Block 202 represents accessing data defining one or more elements of a media presentation. For example, the data may comprise a playlist defining various elements by reference to content data and declaring traits for the elements. In some embodiments, a structured format such as XML or SMIL is used to nest the elements, with at least one child element nested inside a parent element. For example, the nesting may define parallel and/or serial elements that themselves contain additional parallel or serial elements to define the overall orchestration of the media presentation. In practice, the playlist may be provided in a human-readable form or may comprise machine code representing a plurality of objects recognizable by components of the media player as noted below.

Block 204 represents selecting at least one element of the media presentation for use in generating behavior of a media player. For example, the playlist may be parsed to identify the first element or elements of an output sequence for the media presentation. As will be noted below, elements may be specified for output (or other media player behavior) to occur in parallel and/or in series. As an example, a presentation may comprise a first and second segment to be presented in series. Each segment can include audio and video content presented in parallel.

Block 206 represents determining one or more traits applicable to the selected element or elements. For example, the elements of the media presentation may be specified in a structured format where file types or other information are explicitly included along with pointers or indicators of data comprising the elements. For example, the selected element may comprise an identifier of an audio file.

Traits may be determined to be applicable based on declaration alongside or in the selected element(s) and/or based on analyzing the content of the selected element(s). As an example, a playlist may be specified using a composition language. Tags in the composition language may be mapped to one or more traits. For instance, a "<video>" tag may be treated as exposing the viewable, audible, playable, and seekable traits.

Additionally or alternatively, traits may be inherited based on a tree structure specified in the playlist. For example, the plurality of elements of the media presentation may include at least one child element nested inside a parent element. Determining a trait for a parent element can include identifying a trait determined as applicable to one or more of its children. For example, a serial element may define an element as part of a series of elements, with one or more of the elements having a nested video and audio element for output in parallel and having a respective "visible" and "audible" trait. Both children can include a "temporal" trait, and so the serial element can inherit the "temporal" trait, along with the "visible" and "audible" traits.

In some embodiments, an API is defined and includes rules for how traits can be mapped to elements of a media presentation. For example, a "temporal" trait can have a duration property. The serial element can inherit the "temporal" trait having a duration property equal to the sum of its children (if the children are parallel to one another) or the longest duration among parallel children.

Block 208 represents identifying and/or using a functional component of the media player to generate media player behavior using the selected element(s), as needed. Particularly, the functional component (or components) can be identified based on the trait(s), such as by accessing data mapping traits or trait combinations to particular components.

Embodiments include "playback" of both content (e.g., audio, visual content) along with causing media player behavior not directly related to output of video or audio content. For example, a segment can include traits to cause the media player to change configuration (e.g., available controls, appearance) and/or operation (e.g., to submit a tracking beacon). Some such behaviors may not rely on content data of the selected element. For instance, a player may include code for generating user interfaces, providing tracking beacons, and the like without the need to access additional code or other data comprising the selected element.

Notwithstanding the above, embodiments also include players that support media presentations comprising content data along with code and other data that extend the functionality of the media player. For instance, code comprising a plug-in could comprise the selected element and could be used in response to exposure of a trait corresponding to the plug in. As an example, a media presentation may include an element with a "loadable" trait and referencing code available from a remote resource for generating customized controls or overlays. This may allow, for example, a custom interface for recommending a presentation or portion thereof to a social network or other data service. The content data may be specified in machine form, i.e., in a form other than audio or visual data. Examples of data in machine form include, but are not limited to, program code and data structures.

Depending upon the trait(s) exposed, some but not necessarily all content data of the selected element may be used. For example, a composer of the media presentation may specify an audiovisual clip as an element but may expose only the "visible" trait and not the "audible" trait. For instance, different audio may be substituted by specifying a different audio component as "audible" during the same segment of the presentation. As another example, different bitrates may be selected during playback if the "bitrate switchable" trait is exposed.

Aspects of method 200 may occur over the course of the media presentation. For example, playlist parsing module 122 may select elements in accordance with a presentation scheme or schedule. As new elements are selected, corresponding new traits can be exposed and corresponding functional components enabled or used. Additionally, the method can include disabling a previously-enabled functional component of the media player or discontinuing use of the component if a trait corresponding to the previously-enabled functional component is not identified as applicable to the currently-used element(s) of the media presentation.

For example, an initial portion of the presentation may comprise an element that exposes the "seekable" trait along with other traits that cause behavioral control module 126 to provide video player functionality. While that element is among the currently-used elements, playback controls also can be available to the user. A following portion may include an element without the "seekable" trait, which leads behavioral control module 126 to disable the playback controls, with the controls re-enabled once another element that is seekable becomes the currently-used element.

A media presentation can be assembled in any suitable manner. For example, a user may be presented a timeline view for dragging, dropping, and arranging various audio, visual, and other components of the media presentation. Dialog boxes or other selection mechanisms can be provided for specifying other behavioral aspects of the presentation, such as use of tracking beacons, addition of or removal of user controls, and the like. The elements in the timeline may also include desired functional components for use during the media presentation. For example, a user may provide input specifying desired video player types or functions, such as tracking beacons, via a menu or other interface for use in playing back video content of an element.

Figure 3:
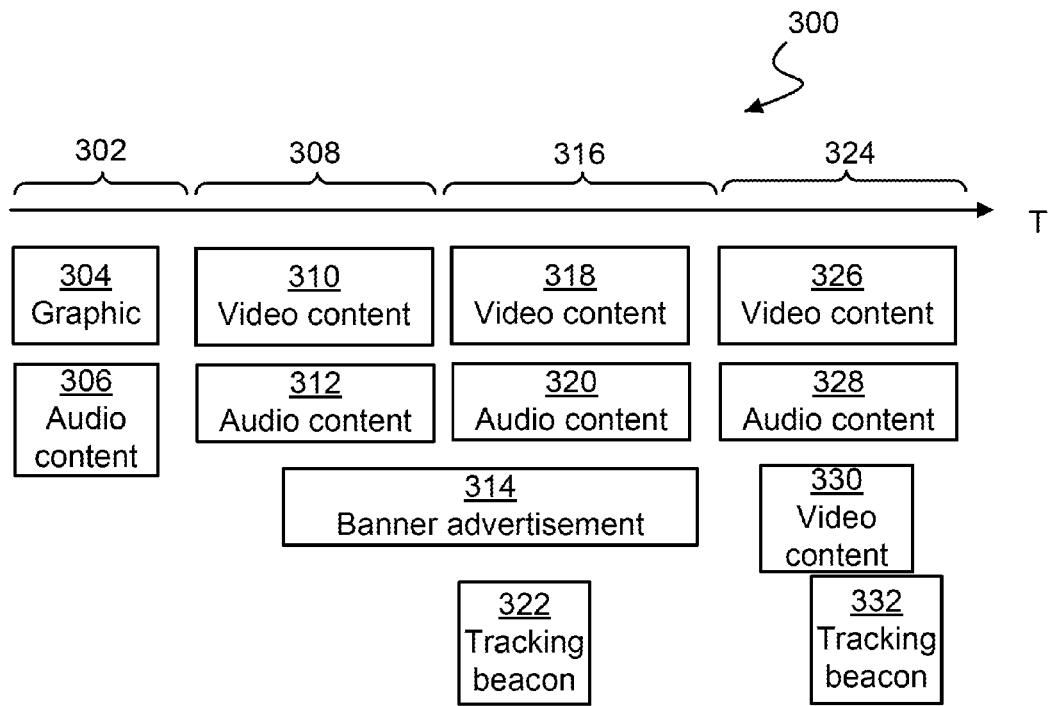
FIGS. 3 and 4 are each a diagram illustrating elements of an exemplary media presentation in a timeline view.

FIG. 3 is a diagram showing a timeline view 300 of an exemplary media presentation. In this example, the media presentation includes four segments, with each segment comprising a plurality of elements. Particularly, segment 302 includes a graphic 304 and audio content 306. Segment 308 includes video content 310 and audio content 312. A banner advertisement 314 begins during segment 308 and continues into segment 316. Segment 316 comprises video content 318, audio content 320, and a tracking beacon 322 that sends tracking data to one or more specified computing devices (e.g., tracking servers). Segment 324 includes video content 326, audio content 328, video content 330, and another tracking beacon 332.

As an example, segments 302 and 316 may comprise advertisements, while segments 308 and 324 comprise other programming. Segment 324 may include a video advertisement in video content 330 presented simultaneously to video content 326 and audio content 328. Tracking beacons 322 and 332 can be used to determine if users continue to view the presentation or navigate away when the advertisements are shown; more complex tracking could be enabled as well, such as tracking mouse activity, volume level, etc.

The composition for the media presentation may be expressed using a playlist specified in a structured markup language. For example, an XML file may be used. In some embodiments, syntax similar to that of a SMIL (Synchronized Multimedia Integration Language) document is used. A timeline view similar to FIG. 3 may be presented during the authoring process and then converted to suitable markup or packaged into a file for consumption by a media player.

For purposes of explanation, pseudo-code expressing a composition is shown below in conjunction with FIG. 4. In the hypothetical syntax below, the "seq" tag denotes a sequence while items with the "par" tag are at least partially parallel, the "delay" parameter is used to delay a component's appearance from the time the parallel structure begins. Additionally, full markup of a presentation can include more complex and detailed information such as component positions, durations, begin times, end times, and more complex resource identifiers (e.g., uniform resource locators, local files, etc.).

```
<presentation>
  <par>
    <seq>
      <image region="logo" src="http://philo-prog01.corp.adobe.com/testing/mod/ads/nbs_logo.jpg" dur="400s"/>
      <image region="logo" src="http://philo-prog01.corp.adobe.com/testing/mod/ads/Pirates3.png" dur="50s"/>
    </seq>
    <seq>
      <video region="content" src="http://philo-prog01.corp.adobe.com/pirates3/Pirates3-1.flv" dur="210s" />
      <video region="content" src="http://philo-prog01.corp.adobe.com/pirates3/ad.flv" dur="30s" >
          <param name="contentType" value="ad"/>
      <video region="content" src="http://philo-prog01.corp.adobe.com/pirates3/Pirates3-2.flv" dur="210s" />
    </seq>
    <seq>
      <image region="banner" src="http://philo-prog01.corp.adobe.com/testing/mod/ads/ad1.jpg" dur="150s" />
      <image region="banner" src="http://philo-prog01.corp.adobe.com/testing/mod/ads/ad2.gif" dur="150s"/>
      <image region="banner" src="http://philo-prog01.corp.adobe.com/testing/mod/ads/ad3.jpg" dur="150s" />
    </seq>
  </par>
</presentation>
```

Figure 4:
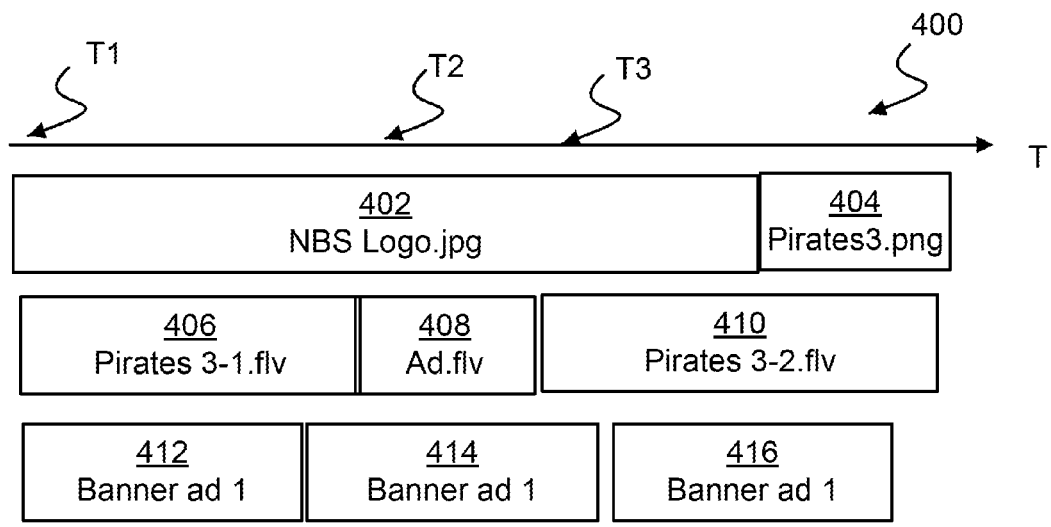

As can be seen in the timeline view of FIG. 4, three sequences are provided and displayed in parallel. A first sequence includes elements 402 and 404, which are presented in parallel with a second sequence 406-408-410 and in parallel with a third sequence 412-414-416. The first sequence may, for example, comprise a series of logos, the second sequence may comprise three video clips played in sequence, and the third sequence can comprise a series of banner ads.

In this example, the presentation begins at T1 by showing the "NBS logo" 402, "Pirates 3-1.flv" video 406, and "Banner ad 1" 412 at respective locations in parallel. For instance, the "NBS logo" element specifies a "logo" region for display and a duration of "400 s." Since element 402 is an "image," the media player can determine that it exposes the "visible" and "spatial" traits. Accordingly, the media player can use a suitable rendering component to display the logo at its intended location and size.

Video element 406 may expose the "temporal," "seekable," "visible," and "audible" traits. Accordingly, components for playing video element 406 at the "content" area can be enabled and used while those traits are exposed. At the same time, element 412 may also expose the "visible" and "spatial" traits, which allow display of banner ad 1 in the play area.

Playback of elements 402, 406, and 412 can occur in parallel, with banner ad 1 being replaced by banner ad 2 as specified by element 414. Once T2 is reached, playback of element 408 can begin. As noted in the source code, although element 408 is defined as a video element, it also includes a parameter declaration "ad." This may cause the video element to be treated as not exposing the "seekable" trait. Thus, when point T2 is reached, the presentation will not expose the "seekable" trait and seek controls (e.g., fast-forward, rewind, etc.) may disappear during the duration of element 408. Once point T3 is reached, element 410 may again expose the "seekable" trait and controls can return.

This example did not feature a tracking beacon or other functional element. As was noted above, a media presentation can include non-media elements that are consumed by the media player according to specified traits. For example, the playlist may include a declaration recognized by the media player as referring to a tracking beacon along with a reference to source for code to generate the beacon and/or attributes, such as a reporting server address to receive viewing/activity data. As an example, a declaration such as "<beacon target="http://www.example.com/trackingServer/> can be included. This element may be recognized as exposing a "functional" trait or other data that causes the media player to use components to send a ping to www.example.com/trackingServer.

Figure 5:
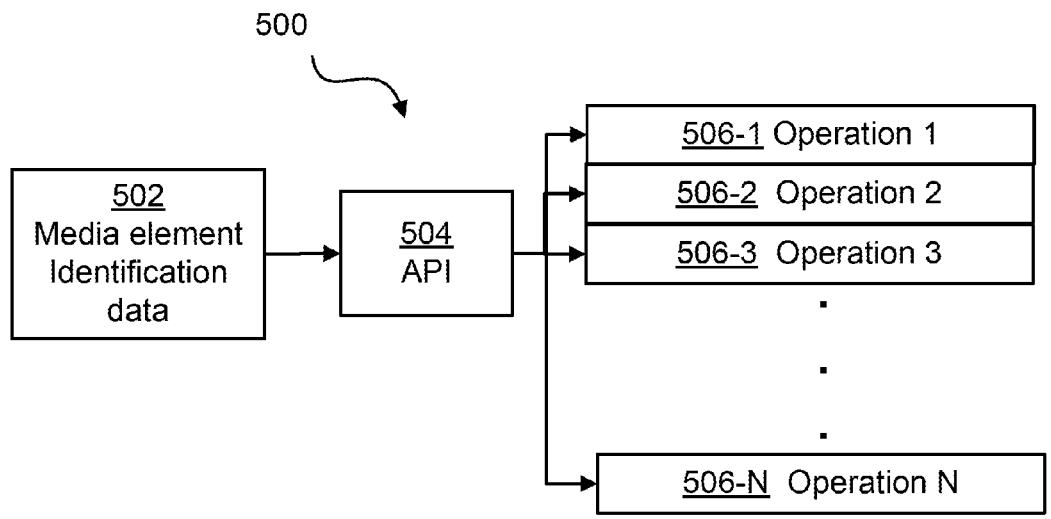
FIG. 5 is a diagram illustrating the use of a playlist comprising well-defined traits in conjunction with an application programming interface (API) for invoking media player functionality.

FIG. 5 is a data flow diagram 500 illustrating the use of a playlist in conjunction with an application programming interface (API) for invoking media player functionality. As was noted above, behavioral control module 126 of FIG. 1 can use traits identified via trait identification module 124 to control playback components 128, such as by parsing a playlist using playlist parsing module 122 or performing other analysis. In some embodiments, this process is carried out by invoking one or more features of the media player via the API. By doing so, programmatic aspects of the media playback process can be separated from the underlying media object(s).

Media element identification data 502 represents information exposing at least one well-defined trait. "Well-defined traits" are expressions in a form suitable for invoking API 504; i.e., the traits are correctly expressed in some manner and include or reference any needed parameters.

In some embodiments, media element identification data 502 comprises a playlist having trait declarations in human-readable form (e.g., a markup file that includes traits). However, as was noted above, a playlist may identify various elements which are mapped to different traits or trait combinations by API 504. In some embodiments, the playlist includes declarations of media elements, with the media elements mapped to trait declarations by suitable code in the media player. For instance, a <video> tag can map to a "video" media element. The "video" media element would have the playable, pausible, etc. traits. As will be noted below, a media player may convert a media composition definition provided in one or more languages to a playlist with well-defined traits used internally by the media player.

As shown in FIG. 5, media element identification data 502 invokes one or more operations via API 504. In this example, several operations 506-1, 506-2, 506-3, and 506-N are illustrated. Operations 506 are meant to represent any type or number of media player behaviors that can be invoked. For example, invoking respective operations for video playback component 128A, audio playback component 128B, and UI Generator component 128C of FIG. 1 can comprise providing appropriate function calls to execute code corresponding to those components. However, the API can invoke any number or type of methods, components, functions, or operations supported by the media player.

Further examples of media player functionality include accessing a remote resource to provide data to and/or receive data from the remote resource. For example, the media player can include code that provides a ping to one or more tracking servers specified in parameters passed in the API. Another example of functionality can include loading plugins to extend the media player. As will be noted below, a media presentation may be specified in a composition definition file using a particular composition language such as SMIL that does not natively include traits. The composition definition file may be loaded and parsed to determine that the file identifies itself as a SMIL composition. This identification can be treated as a trait that triggers the API to load a plugin for converting the SMIL composition to a playlist with suitable trait declarations for use in playing back the file. If a composition definition file identifies itself using a different language, the identification can trigger the API to load a different plugin to recognize elements in the composition language as exposing various traits.

Figure 6:
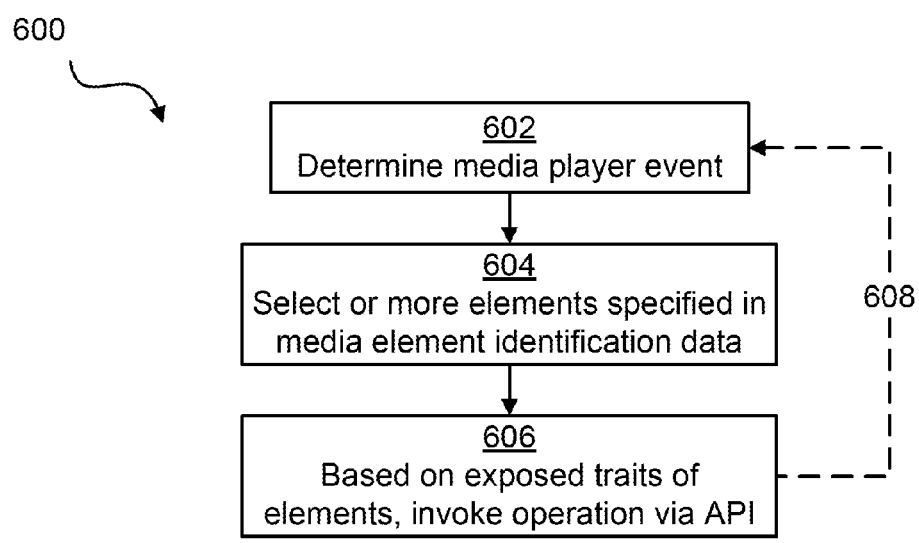
FIG. 6 is a flowchart depicting steps in an illustrative method for producing a playlist comprising well-defined traits.

FIG. 6 is a flowchart depicting steps in an illustrative method 600 for using a playlist comprising well-defined traits to control media player functionality. At block 602, a media player event is identified. For example, the event may be the initial play command referencing a playlist or media composition file. For a media presentation already in progress, the event may comprise the end of a first sequence and the beginning of another sequence, or simply an indication that a certain time period has elapsed or time marker has been reached.

Block 604 represents selecting one or more elements specified in the media element identification data for use. For example, the objects of the playlist may be treated sequentially, subject to any parallel structures in a given sequence. When a first sequence ends, then the element corresponding to the next sequence can be selected for use at block 604.

Block 606 represents evaluating the traits exposed by the selected element or elements and invoking one or more corresponding operations via the API. For example, when a playlist is initially loaded, the first element may comprise a <graphic/> and <audio/> element to be presented in parallel. The exposed traits for the sequence can include "spatial" and "visible" with regard to the graphic and "temporal" and "audible" with regard to the audio component. Due to the exposed trait combinations, a suitable operation can be invoked via the API to use an imaging component to display the graphic and an audio playback operation can be invoked to provide the audio output.

Dashed line 608 is included to represent that method 600 can comprise an ongoing process during a media presentation. For instance, after all elements of the first sequence have been completed or after a first time marker has been reached, a new media player event can occur to signify that the next element or sequence of the media presentation is to be considered. The element or elements of that sequence can be selected at block 604 and at 606 the exposed traits can be used to invoke API operations. This process can continue until completion of the presentation.

As was noted above, use of an API dependent upon exposed traits can separate programmatic aspects of the media player from the underlying media objects. This can enhance the development process since the media player does not need to be customized for particular object formats. Since the playlist or other identification data provides a trait and a pointer to the object data, the playback components have no need to "know" what they are playing back. Accordingly, the media player does not need to be coded to play back video of a specific format based on a particular file location or URL. Additionally, the same media player component can be used for multiple different presentation scenarios.

The use of a programmatic API additionally allows for non-media elements of the presentation to be treated on an equal footing with media elements (e.g., graphics, video, sound). As an example, in previous media players, tracking beacons are treated as secondary considerations—in some cases, a script or other code is written to include a single-pixel image, with loading of the pixel-image acting as the tracking beacon.

On the other hand, embodiments configured in accordance with the present subject matter can support one or more tracking methods that can be invoked via the API in the same manner as a media playback methods are invoked. As a result, a developer can include a "tracking" element in the playlist and specify a particular time or duration for the tracking event (or events) to occur. For example, a tracking method may be called and passed a tracking server destination, tracking start time, and tracking end time. As another example, the method may simply be called and passed a tracking server destination when the tracking element is encountered in the playlist.

The API can support dynamic configuration of the media player as well. For example, a functional component may be specified as a media element. The media element may expose traits that are mapped to a method for loading a plugin and rule set for converting a composition data file into a playlist for further parsing. As another example, the media element may expose a "loadable" trait and specify a plugin for playing back content (e.g., a video codec).

Treatment of elements referencing functional components on equal footing as elements referencing media components can simplify the design process for a media presentation. For example, a media composition tool can present a timeline view similar to that shown in FIGS. 3-4. In addition to audio, video, and visual components, a developer can drag and drop functional components such as beacons and other elements into the timeline. This data can then be used to generate a playlist or other media composition data.

Figure 7:
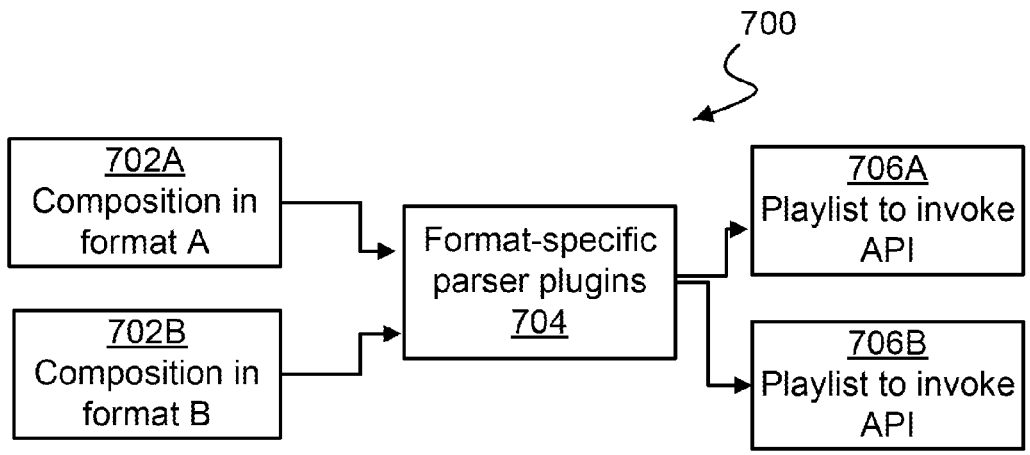
FIG. 7 is a diagram illustrating adaptive parsing of media compositions to obtain a playlist comprising well-defined traits.
Figure 8:
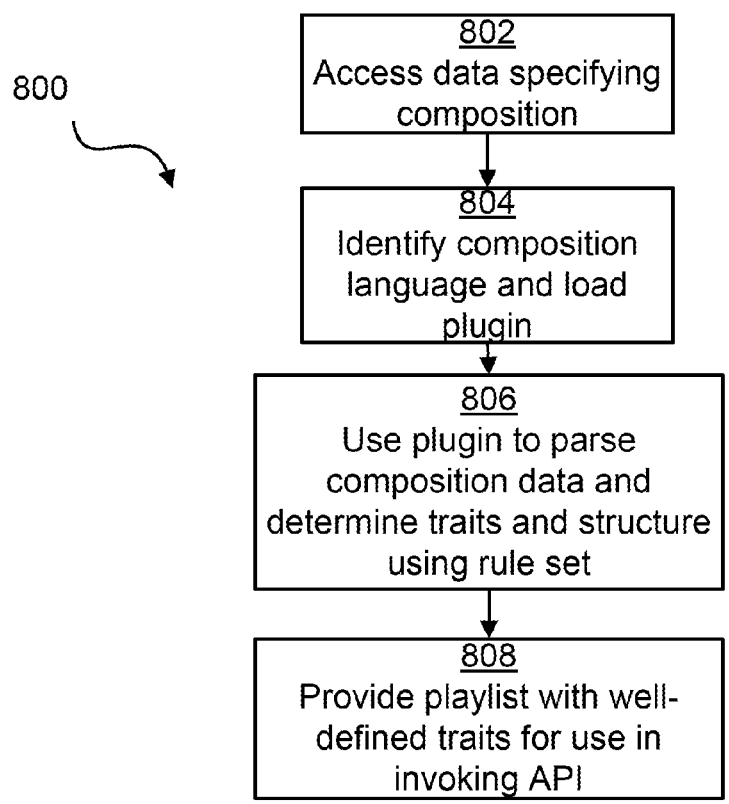
FIG. 8 is a flowchart depicting steps in an illustrative method for using a playlist comprising well-defined traits to control media player functionality.

FIG. 7 is a diagram 700 illustrating adaptive parsing of media compositions to obtain a playlist comprising well-defined traits, while FIG. 8 is a flowchart 800 depicting steps in an illustrative method for producing a playlist comprising well-defined traits. In some embodiments, compositions specified in different formats can be parsed and converted to a playlist for use in invoking an API. In this example, each of a composition 702A in format A and a composition 702B in format B is processed using a format-specific parser plugin 704 to produce a respective playlist 706A and playlist 706B. Use of format-specific parser plugins can allow a media player to present compositions specified using different types of composition definition syntaxes.

As shown at block 802 in flowchart 800, data specifying a composition can be accessed. For example, a .smi file in the SMIL format may be accessed by a web browser, media player, or other component that is to provide a media presentation. At block 804, the composition language is identified and the appropriate plugin is loaded. For example, as was mentioned above, the document-type declaration or other identifying information in the composition data may be treated as a "media element" that includes a trait that invokes a method for loading a plugin. As another example, the plugin may be identified and loaded in response to the file extension for the composition data.

Block 806 represents using the plugin to parse the composition data in order to determine the structure of the media presentation and assign appropriate traits. For example, parallel and series components can be identified using the native syntax for the composition data. Media types can be identified to determine corresponding elements to include in the playlist and appropriate trait types can be determined. For example, video content can be identified and used to generate one or more elements having "visual" and "temporal" traits.

Block 808 represents providing a playlist with well-defined traits for use in invoking the API. For example, the playlist may be made available to the behavioral control module or other components of the media player that parse the playlist and invoke methods via the API based on exposed traits. As another example, the playlist may be stored in memory for later use.

The API may support functionality that does not have a corresponding syntax in the native format for the media composition. For example, the API may support calling a tracking beacon method built into the media player as noted above. In some embodiments, the parser is configured to interpret predefined extensions to existing formats for invoking functionality of the API directly. For example, an addition to the SMIL standard can be supported for specifying the insertion of tracking beacons at one or more specified points in the presentation. As another example, existing features of the native format may be mapped to API calls. For instance, a single-pixel image included in a SMIL composition may be converted to an element calling the tracking beacon method in parallel to one of the other elements of the playlist.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
    accessing, by a media player, markup defining a plurality of elements of a media presentation;
    selecting an element from the plurality of elements of the media presentation for use in generating behavior of the media player, the selected element comprising a parameter;
    determining a trait corresponding to the selected element based at least in part on the parameter; and
    based on the determined trait, identifying a functional component of the media player to generate media player behavior using the selected element based on a mapping of predefined traits to predefined functional components, the mapping indicating that the determined trait corresponds to the identified functional component,
    wherein the mapping of predefined traits to predefined functional components comprises a first mapping of a viewable trait and a spatial trait with a first functional component comprising an overlay.

2. The method of claim 1, further comprising:
    enabling the identified functional component of the media player and using the identified functional component to generate output or receive input based on the selected element of the media presentation.

3. The method of claim 1, further comprising:
    disabling a previously-enabled functional component of the media player if a trait corresponding to the previously-enabled functional component is not determined as applicable to the selected element of the media presentation.

4. The method of claim 1, wherein the selected element comprises at least one child element nested therein, and wherein determining a trait corresponding to the selected element comprises identifying a trait corresponding to the at least one child element.

5. The method of claim 1, wherein the selected element of the media presentation comprises at least one of a video component, an audio component, a media player control, or an overlay.

6. The method of claim 1, wherein the trait identifies the selected media element as at least one of audible, viewable, temporal, or seekable.

7. The method of claim 1, wherein generating media player behavior comprises outputting video, outputting audio, presenting a user interface, or presenting additional content overlaying other output.

8. The method of claim 1,
wherein selecting an element of the media presentation comprises:
selecting a first element from the plurality of elements; and
selecting a second element from the plurality of elements, the second element different than the first element;
wherein determining a trait corresponding to the selected element comprises:
determining a first trait corresponding to the first element; and
determining a second trait corresponding to the second element, the first trait different than the second trait; and
wherein the identified functional component is mapped to the first trait and the second trait.

9. The method of claim 1,
wherein determining a trait corresponding to the selected element comprises:
determining a first trait corresponding to the first element; and
determining a second trait corresponding to the first element; and
wherein the identified functional component is mapped to the first trait and the second trait.

10. The method of claim 1, wherein the mapping of predefined traits to predefined functional components comprises:
a first mapping of a temporal trait, a viewable trait, and a spatial trait with a first functional component comprising a video player without controls; and
a second mapping of the temporal trait, the viewable trait, a playable trait, a pausible trait, and a seekable trait with a second functional component comprising a video player with a plurality of controls.

11. The method of claim 1, wherein the overlay comprises a control overlay for sharing via a social network.

12. The method of claim 1, wherein the selected element of the media presentation specifies a resource separate from the media player which the media player is to access and wherein generating media player behavior comprises accessing the resource.

13. The method of claim 12, wherein accessing the resource comprises providing a tracking beacon to a server.

14. The method of claim 12, wherein accessing the resource comprises loading an additional program component to dynamically extend the functionality of the media player.

15. A computing system comprising a processor with access to a computer readable medium embodying program components, the program components comprising:
a playlist parsing module that configures the computing system to parse a playlist comprising markup to identify a plurality of elements of a media presentation and select an element from the plurality of elements for use in generating media player output, the selected element comprising a parameter;
a trait identification module that configures the computing system to identify a trait corresponding to the selected element based at least in part on the parameter; and
a behavior control module that configures the computing system to direct a functional component of the media player to generate output using the selected element based on the trait, wherein the functional component is identified based on a mapping of predefined traits to predefined functional components, the mapping indicating that the identified trait corresponds to the functional component,
wherein the mapping of predefined traits to predefined functional components comprises a first mapping of a viewable trait and a spatial trait with a first functional component comprising an overlay.

16. The computing system of claim 15, wherein determining a trait corresponding to the selected element based at least in part on the parameter comprises determining a first trait and a second trait different than the first trait, wherein the functional component is mapped to at least the first trait and the second trait.

17. The computing system of claim 15, wherein the behavioral control module configures the computing system to:
direct a video output component to generate video output if the trait identifies the selected element as visible;
direct an audio output component to generate audio output if the trait identifies the selected element as audible; and
direct an interface generation component to provide a user interface for changing the playback point if the trait identifies the selected element as seekable.

18. The computing system of claim 15, wherein the trait identification module configures the computing system to identify a trait corresponding to a child of the selected element as corresponding to the selected element.

19. The computing system of claim 15, wherein the playlist parsing module configures the computing system to select at least two elements from the plurality of elements of the media presentation for simultaneous output, and wherein the behavior control module is configured to direct a plurality of functional components of the media player to generate output using the selected at least two elements from the plurality of elements.

20. The computing system of claim 15, wherein the behavioral control module configures the computing system to direct a data handling component of the media player to access a resource separate from the media player and to perform at least one of receiving data in machine form from the resource or providing data in machine form to the resource.

21. The computing system of claim 20, wherein the resource comprises a server and directing the data handling component to interface with the resource comprises providing a tracking beacon to the server.

22. A non-transitory computer-readable medium comprising program code, the program code comprising:
- program code for accessing a playlist comprising markup defining a plurality of elements of a media presentation;
- program code for selecting an element from the plurality of elements of the media presentation for use in generating behavior of a media player, the selected element comprising a parameter;
- program code for identifying a trait corresponding to the selected element based at least in part on the parameter;
- program code for determining a functional component to use in providing media player behavior using the selected element comprising the identified trait, wherein said determining is based on a mapping of predefined traits to predefined functional components, the mapping indicating that the identified trait corresponds to the determined functional component, wherein the mapping of predefined traits to predefined functional components comprises a first mapping of a viewable trait and a spatial trait with a first functional component comprising an overlay; and
- program code for enabling the functional component to provide media player behavior using the selected element.

23. The non-transitory computer-readable medium of claim 22, wherein the program code further comprises:
- program code for disabling a previously-enabled functional component of the media player if a trait corresponding to the previously-enabled functional component is not identified as applicable to the selected element of the media presentation.

24. The non-transitory computer-readable medium of claim 22, wherein the plurality of elements comprise at least one child element nested inside the selected element, and wherein identifying the trait corresponding to the selected element comprises identifying a trait corresponding to the child element as applicable to the selected element.

25. The non-transitory computer-readable medium of claim 22, wherein media player behavior comprises outputting video, outputting audio, presenting a user interface, presenting additional content overlaying other output, or tracking use of the media player.

26. The non-transitory computer-readable medium of claim 22, wherein the selected element of the media presentation specifies a resource separate from the media player which the media player is to access, and providing media player behavior comprises accessing the resource.

27. A method, comprising:
- accessing, by a media player, markup defining a plurality of elements of a media presentation;
- selecting an element from the plurality of elements of the media presentation for use in generating behavior of the media player, the selected element comprising a parameter;
- determining a trait corresponding to the selected element based at least in part on the parameter; and
- based on the determined trait, identifying a functional component of the media player to generate media player behavior using the selected element based on a mapping of predefined traits to predefined functional components, the mapping indicating that the determined trait corresponds to the identified functional component,
- wherein the mapping of predefined traits to predefined functional components comprises:
  - a first mapping of a temporal trait, a viewable trait, and a spatial trait with a first functional component comprising a video player without controls; and
  - a second mapping of the temporal trait, the viewable trait, a playable trait, a pausible trait, and a seekable trait with a second functional component comprising a video player with a plurality of controls.

28. The method set forth in claim 27, further comprising:
enabling the identified functional component of the media player and using the identified functional component to generate output or receive input based on the selected element of the media presentation.

29. The method of 27, further comprising:
disabling a previously-enabled functional component of the media player if a trait corresponding to the previously-enabled functional component is not determined as applicable to the selected element of the media presentation.

30. The method of claim 27, wherein the selected element comprises at least one child element nested therein, and wherein determining a trait corresponding to the selected element comprises identifying a trait corresponding to the at least one child element.

31. The method of claim 27, wherein the selected element of the media presentation comprises at least one of a video component, an audio component, a media player control, or an overlay.

32. The method of claim 27, wherein generating media player behavior comprises outputting video, outputting audio, presenting a user interface, or presenting additional content overlaying other output.

33. The method of claim 27, wherein the selected element of the media presentation specifies a resource separate from the media player which the media player is to access and wherein generating media player behavior comprises accessing the resource.

34. The method of claim 33, wherein accessing the resource comprises providing a tracking beacon to a server.

35. The method of claim 33, wherein accessing the resource comprises loading an additional program component to dynamically extend the functionality of the media player.

* * * * *